Aug. 31, 1948.    T. B. FUNK    2,448,176
MOTORIZED LIFT TRUCK
Filed Aug. 7, 1942    3 Sheets-Sheet 1
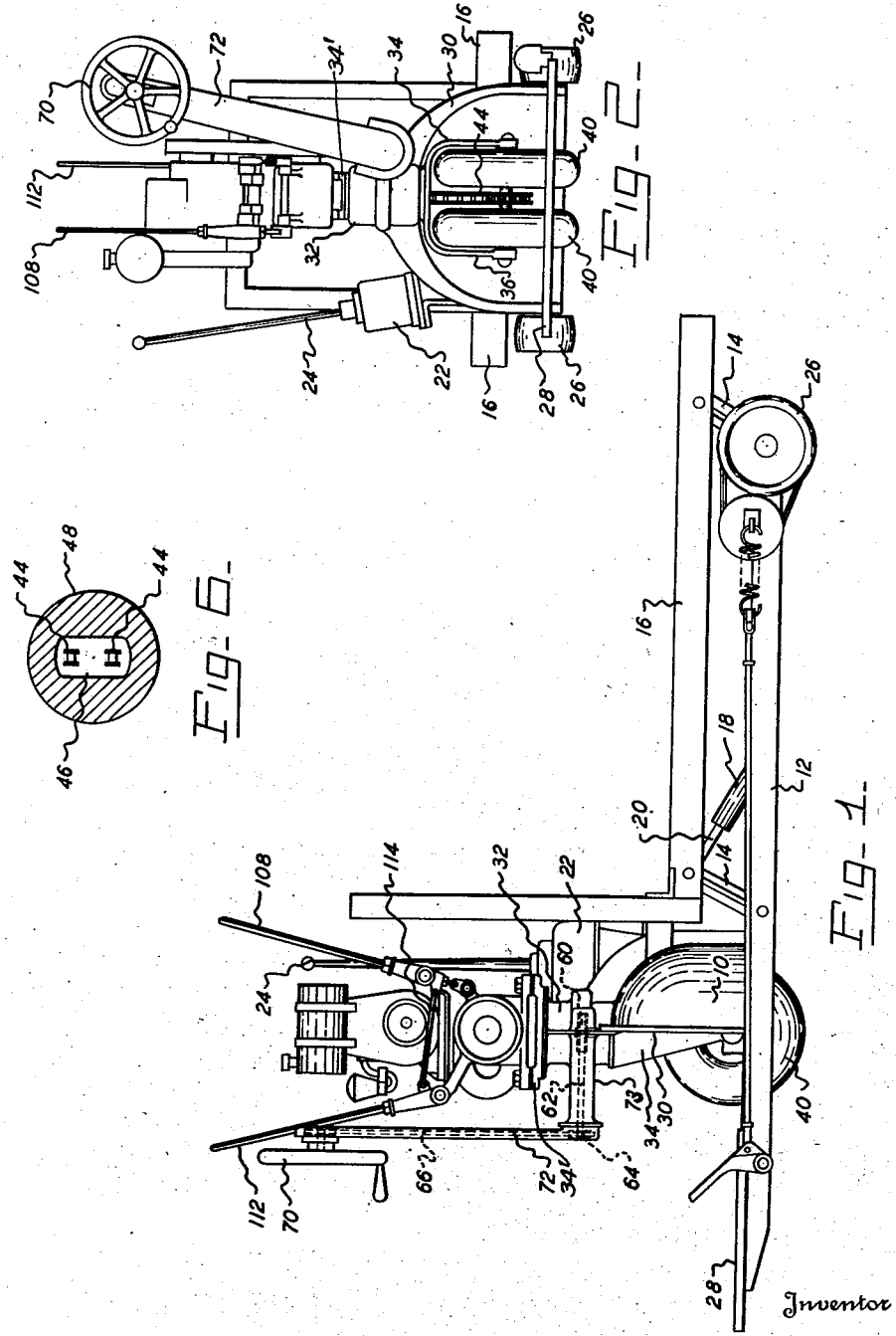
Inventor
TRUMAN B. FUNK
By Beaman & Langford
Attorneys.

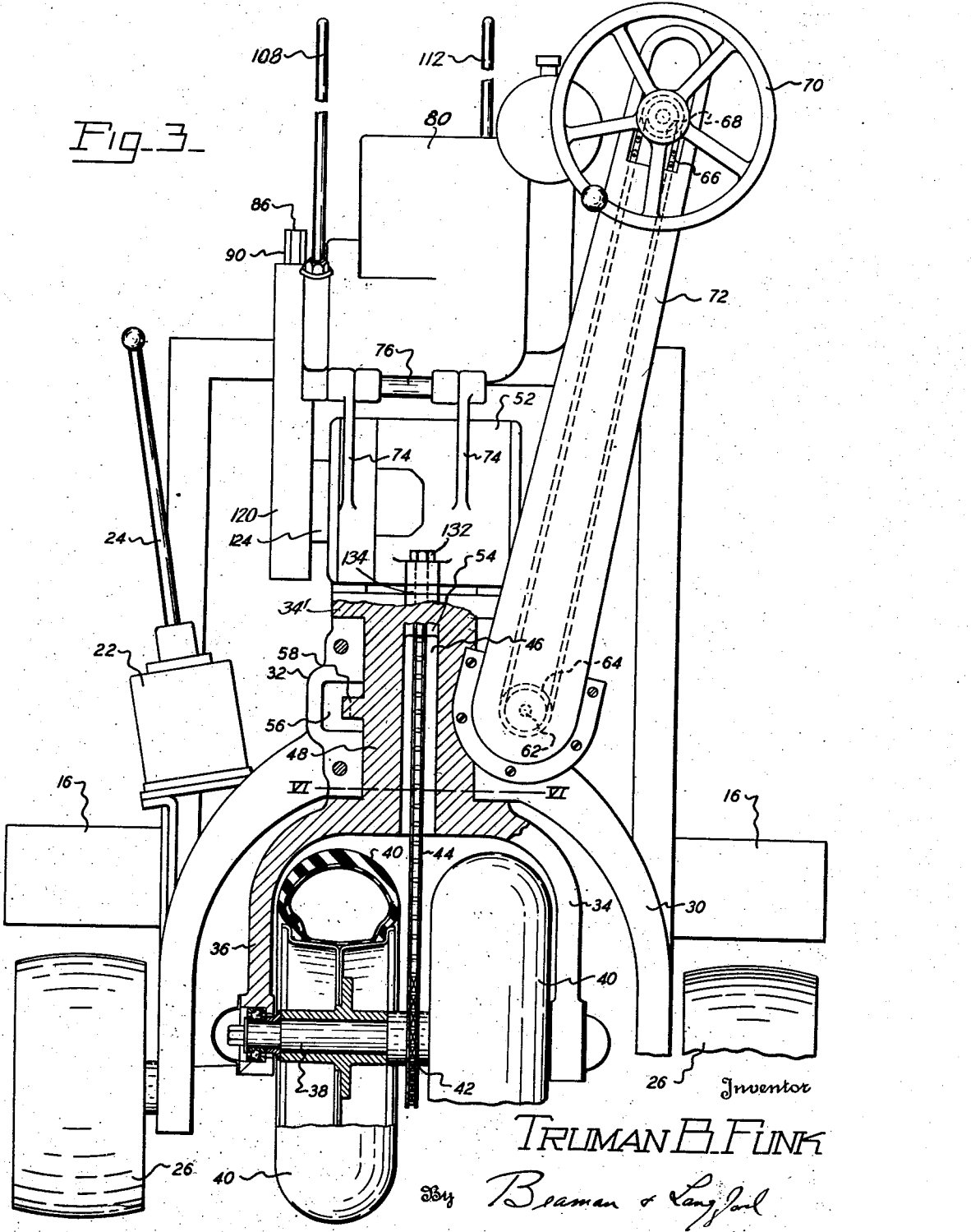

Aug. 31, 1948.   T. B. FUNK   2,448,176
MOTORIZED LIFT TRUCK
Filed Aug. 7, 1942   3 Sheets-Sheet 3
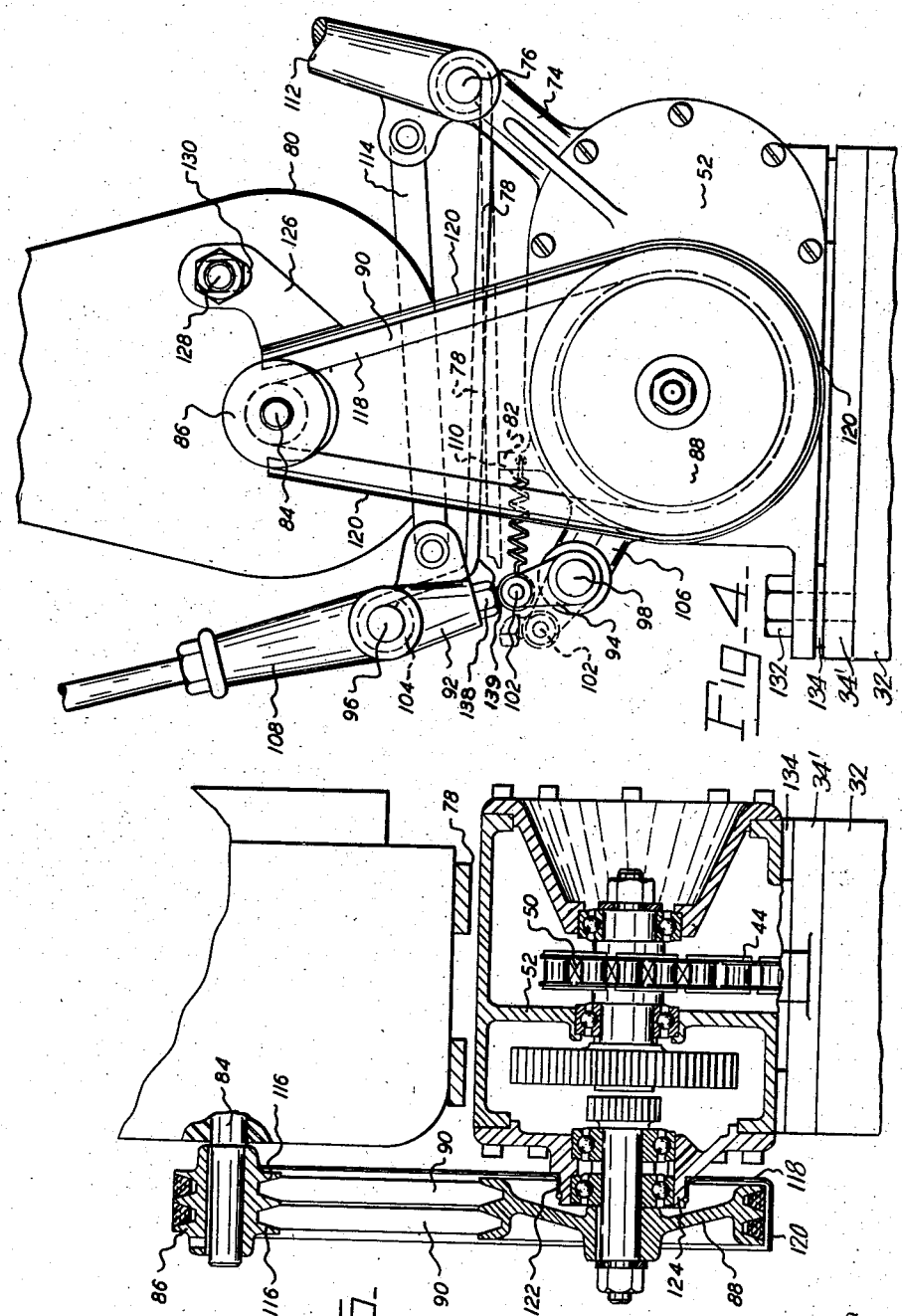
Inventor
TRUMAN B. FUNK
By Blaman & [illegible]
Attorneys Patented Aug. 31, 1948

2,448,176

UNITED STATES PATENT OFFICE 2,448,176

MOTORIZED LIFT TRUCK

Truman B. Funk, Jackson, Mich., assignor, by mesne assignments, to Truck-Man, Inc., Jackson, Mich., a corporation of Michigan Application August 7, 1942, Serial No. 453,943

7 Claims. (Cl. 180—13)

The present invention relates to improvements in vehicles, having particular reference to motorized steering and driving columns and associated structure to be used in lift trucks and other similar vehicles.

To be more fully described in the following paragraphs, the features and objects of the present invention include (a) the arrangement of the motor, speed reducing unit and swiveled column; (b) mounting of speed reducing unit to provide for adjustment of endless driving element; (c) control of driving belt; (d) construction and arrangement of motorized column and associated structure; (e) arrangement and construction of swiveled post and drive for ground wheel; and (f) location of steering mechanism upon swiveled post.

Other objects and advantages of the present invention residing in the construction, combination and arrangement of parts will become apparent from the detailed description and annexed claims.

In the drawing wherein one form of the invention is illustrated,

Fig. 1 is a side elevational view,

Fig. 2 is an end view,

Fig. 3 is a view similar to Fig. 2 slightly enlarged and partially shown in cross section, with the steering column swiveled through 180°, Fig. 4 is a fragmentary side elevational view of the drive control, Fig. 5 is an enlarged fragmentary view partially shown in cross section of the speed reducing unit, and Fig. 6 is a cross-sectional view of the vehicle post taken on line VI—VI of Fig. 3.

Referring to the drawings, in Figs. 1 and 2 the features of the present invention are shown illustrated in connection with an industrial lift truck generally designated 10, having a main frame 12 to which swinging arms 14 are connected and support the lifting platform 16. A hydraulic cylinder 18 and piston rod 20 are connected between the frame 12 and platform 16 to raise and lower the latter. The hydraulic mechanism for actuating the piston rod 20 is indicated at 22 having a manual pumping handle 24.

Spaced wheels 26, located at the forward end of the truck, are supported in the frame 12. As shown, the frame 12 extends rearwardly to form an operator platform 28. Supported between the sides of the frame 12 forward of the platform 28 is a housing 30 shown as of cast construction with its central part 32 constituting a vertical bearing for the steering and driving column generally designated 34.

As more clearly shown in Fig. 3, the structure 34 comprises a lower fork portion 36 in which is supported an axle 38 carrying the drive wheels 40. Fixed to the axle 38 is a sprocket 42 over which runs a drive chain 44 which extends upwardly through the opening 46 of the central post portion 48 and over the sprocket 50 of the speed reducing unit 52, carried by and movable with the steering and driving column and structure 43. This speed reducing unit 52 is mounted on flange 34' provided at the top of the column portion 48, as best illustrated in Figure 3. As shown in Fig. 6, the opening 46 of the post 48 is oblong to give maximum wall thickness yet provide clearance for the chain 44. For additional strength and to provide a center for machining, an integral crossbar 54 is provided at the upper end of the post 48 which is straddled by the chain 44.

The central portion 32 has an annular recess 56 to receive a ring gear 58 fixed to the post 48. This gear is driven by a worm gear 60 located upon a shaft 62 and carrying a sprocket 64 over which the drive chain 66 runs driven by the sprocket 68 on the hand wheel 70. The steering housing 72 is supported from the housing 32 through a horizontal housing 73 in which the shaft 62 carrying the worm 60 is supported.

As more clearly shown in Fig. 4, the speed reducing unit 52 has a bracket 74 to support the hinge pin 76 of the platform 78 upon which the motor 80 is supported for pivotal movement. In one position, the platform 78 seats upon the projection 82 of the housing 52 as shown in dotted outline. The power take off shaft 84 of the motor 80 carries a multi-groove pulley 86 for driving the pulley 88 of the speed reducing unit 52 through V-belts 90 of well known construction. The wheels 40 are driven to propel the lift truck by tightening the belts 90.

The mechanism for selectively driving the wheels 40 comprises toggle members 92 and 94 carried upon pins 96 and 98, respectively. An adjustable extension 100 of the member 92 is pinned at 102 to the member 94. Referring to Fig. 4, the pin 96 is supported in an angular portion 104 of the platform 78 while the pin 98 is supported in a bracket 106 on the speed reducing unit 52. The toggle defined by the members 92 and 94 is extended and collapsed by the manual lever 108 formed integral with the member 92. A spring 110 holds the toggle in its extended position. For the operator's convenience, a lever 112 corresponding to the lever 108 is located upon the opposite side, being supported for pivotal movement on the pin 76. Movement of the lever 112 is transferred through the bar 114 to extend and collapse the toggle in the manner of the lever 108.

To assure an interruption in power transmission between the pulleys 86 and 88 as desired, means are provided to project the belts 90 out of driving relation with the grooves 116 of the pulley 86 at the time the belts 90 are slackened. This is accomplished through a metal stamping 118 having a border flange 120 and a flanged opening 122 for piloting the same upon the hub 124. A bracket 126 attached at the upper end of the stamping 118 has guiding relation with a pin 128 upon the engine 80 received in an elongated hole 130. With the toggle extended and the belts 90 tightened, there will be running clearance between the belts 90 and the flange 120. However, upon slackening the belts upon collapsing the toggle, the belts are confined by the flange 120 to project the loops of the belts out of the grooves 116. Except for the flange 120, upon movement of the pulleys 86 and 88 toward each other, the belts would tend to bulge outward without entirely freeing the same from the grooves of the upper pulley 86.

The operation of the steering and driving column for propelling the truck over the ground is briefly described as follows: With the operator upon the platform 28, the steering wheel 70 is manipulated to swivel the steering and driving column 34 about a vertical axis. By actuating either one of the levers 108 and 112, the operator is able to selectively connect and disconnect the motor with the ground wheels 40. For the sake of simplicity of construction no reversing mechanism is provided in connection with the drive, with the result that the wheels 40 are always rotated in the same direction. However, as should be obvious, the operator may swivel the steering and driving column 34 throughout 360° which enables the driving of the truck in either direction and to steer the same in all directions. As heretofore described manipulation of the handles 108 and 112 will collapse or extend the toggles formed by the parts 92 and 94 to raise and lower the platform 78 upon which the motor 80 is supported. In this manner the drive belt 118 is tightened and slackened to selectively drive the wheels 40 through the chain 44.

When it becomes necessary to tighten the chain 44 in service, this may be conveniently done by increasing the spacing between the central part 32 and the unit 52 by removing the studs 132 and inserting one or more washers 134 as may be necessary. To adjust the drive belt 118 in service, a threaded eye bolt 136 is incorporated into the toggle by being threaded into the part 92 and locked in positions of adjustment by the nut 138.

Having described my invention, what I desire to secure by Letters Patent and claim is:

1. In a lift truck or the like, a motorized steering and driving column and mounting structure comprising a fixed frame, a full swivel frame supported in said first frame for movement about a vertical axis throughout substantially 360 degrees, a driven wheel mounted in said swivel frame, said swivel frame having a hollow vertical column concentric with said vertical axis, power means carried by the swivel frame above the vertical column, drive means for said wheel housed and extending through said column in the plane of the vertical axis, and steering means carried entirely by the truck, having operating parts carried by the fixed frame and operated parts on the column and housed in said fixed frame and steering operating means presented exteriorly to said column.

2. In a lift truck or the like, a motorized steering and driving column and mounting structure comprising a fixed frame, a full swivel frame supported in said fixed frame for movement about a vertical axis throughout substantially 360 degrees, a driven wheel mounted in said swivel frame having a driving axle including a sprocket located substantially at the vertical axis of the swivel frame, a hollow vertical column concentric with said vertical axis constituted as a part of said swivel frame, speed reducing mechanism supported on said swivel frame and above said column including a driving sprocket also located substantially at the vertical axis, a driving chain running over said sprocket and extending through and housed in said hollow column, and steering means carried entirely by the truck having operating parts carried by the fixed frame and operated parts on the column.

3. In the combination set forth in claim 2, wherein said speed reducing mechanism is in the form of a self-contained unit, and means for moving said mechanism with respect to said fixed frame for vertical adjustment to tighten said drive chain upon said sprocket.

4. In a lift truck or the like, a motorized steering driving column and mounting structure comprising a fixed frame, a full swivel frame supported in said fixed frame for movement about a vertical axis throughout substantially 360 degrees, a propelling and steering wheel mounted in said swivel frame, said swivel frame including a hollow vertical column concentric with said vertical axis, speed reducing means mounted upon said swivel frame above said column, a prime mover supported upon said speed reducing mechanism, drive means including a pair of sprockets and a sprocket chain disposed substantially axially with respect to and within said hollow vertical column, and steering means carried entirely by the truck having operating parts carried by the fixed frame and operated parts on the column.

5. In the combination set forth in claim 4 means supporting said prime mover mounted for movement relative to said speed reducing mechanism, a belt drive extending between said prime mover and speed reducing mechanism, and manual means for causing relative movement between said prime mover and speed reducing mechanism for tightening and slackening said belt drive.

6. In a lift truck or the like, a motorized steering and supporting column and mounting structure comprising a fixed frame, a full swivel frame supported by said fixed frame for movement about a vertical axis throughout substantially 360 degrees, driving and steering wheels supported by said swivel frame, said swivel frame including a hollow vertical column concentric with said vertical axis, speed reducing mechanism mounted upon said swivel frame above said column, drive mechanism for said wheel extending through said column and connected to said speed reducing mechanism, mounting and supporting means for said speed reducing mechanism to adjust the same relative to said column and wheel, a prime mover supported upon said speed reducing mechanism and in substantially vertical alignment with said column, driving means between said prime mover and speed reducing mechanism, and steering means carried entirely by the truck having operating parts carried by the fixed frame and operated parts on the column.

7. In a lift truck or the like, a motorized steering and driving column and supporting structure comprising a fixed frame, a full swivel frame supported in said fixed frame for movement about a vertical axis throughout substantially 360 degrees, a hollow central column concentric with said vertical axis, drive and steering wheels carried by the full swivel frame, drive mechanism extending through said column, speed reducing mechanism mounted upon said swivel frame above said column, a motor mounted upon said speed reducing mechanism above said column, means constituting a belt drive between said motor and speed reducing mechanism, means supporting said motor for movement relative to said speed reducing mechanism, and manual means for effecting said relative movement to slacken and tighten said belt drive.

TRUMAN B. FUNK.

REFERENCES CITED

The following references are of record in the file of this patent:

UNITED STATES PATENTS

| Number | Name | Date |
|---|---|---|
| 1,282,118 | Ornberg | Oct. 22, 1918 |
| 1,346,914 | Sauvage | July 20, 1920 |
| 1,346,915 | Sauvage | July 20, 1920 |
| 1,428,053 | Osborn | Sept. 5, 1922 |
| 1,833,844 | Lusse | Nov. 24, 1931 |
| 1,915,377 | Morse | June 27, 1933 |
| 2,209,177 | Stoltz | July 23, 1940 |
| 2,209,356 | Schreck | July 30, 1940 |
| 2,220,361 | Westphal | Nov. 5, 1940 |
| 2,249,838 | LeMunyon | July 22, 1941 |
| 2,254,592 | Berkeley | Sept. 2, 1941 |
| 2,299,150 | Kennedy | Oct. 20, 1942 |
| 2,306,042 | Custer | Dec. 22, 1942 |
| 2,327,583 | Framhein | Aug. 24, 1943 |
| 2,336,642 | Schreck | Dec. 14, 1943 |